July 11, 1933.   T. ZUSCHLAG   1,917,417
METHOD AND APPARATUS FOR MEASURING ALTERNATING
ELECTROMOTIVE FORCES AND IMPEDANCES
Filed Aug. 6, 1932    2 Sheets-Sheet 1

INVENTOR,
Theodor Zuschlag
BY
Bartlett, Eyre, Scott & Keel
ATTORNEYS.

Patented July 11, 1933

1,917,417

UNITED STATES PATENT OFFICE

THEODOR ZUSCHLAG, OF WEST ENGLEWOOD, NEW JERSEY, ASSIGNOR TO MAGNETIC ANALYSIS CORPORATION, OF LONG ISLAND CITY, NEW YORK, A CORPORATION OF NEW YORK

METHOD AND APPARATUS FOR MEASURING ALTERNATING ELECTROMOTIVE FORCES AND IMPEDANCES

Application filed August 6, 1932. Serial No. 627,751.

The present invention relates to the art of electric measurements and comprises a method of measuring impedances or alternating electromotive forces which is independent of phase differences and which permits of direct comparison of an unknown impedance or electromotive force with a known impedance or electromotive force, respectively. The invention includes also a novel combination of apparatus which is suitable for practising the method and which involves simple readily obtainable parts. The apparatus permits of ready adjustment for sensitive and accurate electrical measurements.

Broadly the method comprises adjusting the constants of a pair of rectifier input circuits until the output of the rectifiers is equal when alternating electromotive forces, of which at least one is that to be measured, are impressed upon the circuits and then substituting for one of the impressed electromotive forces a known or standard electromotive force and, without changing the constants of either circuit, determining, by adjustment of the known electromotive force, that value thereof which will return the direct current outputs of the rectifiers to equality. The value of the unknown electromotive force is then equal to that of the thus selected known electromotive force.

The method, as above broadly described, is equally applicable to the measurement of unknown impedances as to the measurement of alternating voltages, for a comparison of the potential differences across known and unknown impedances, when the impedances are connected in a series circuit, will, of course, give a measure of the unknown impedance in terms of the known.

As the method involves comparison of electromotive forces after rectification, direct current measuring or indicating instruments only need be used and as it is a null method, a sensitive indicating instrument, such as a direct current galvanometer may be used to advantage.

For a better understanding of the new method and of the apparatus for practising the same, reference may be had to the accompanying drawings, of which—

Figure 1:
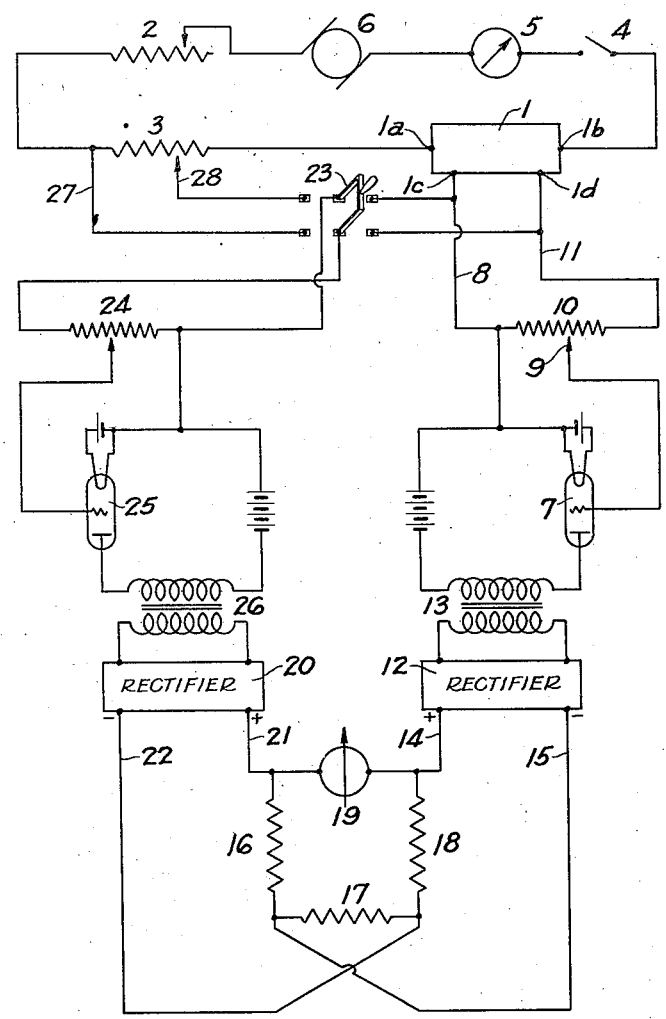
Fig. 1 illustrates diagrammatically the preferred form of apparatus, whether for measurement of alternating voltage or of impedance.

In Fig. 1 an unknown impedance or alternating voltage is represented symbolically at 1. Element 1 may include inductances, capacities, iron cored or air cored coils or combinations thereof. For the purpose of the present description of Fig. 1 it is sufficient to consider element 1 as an unknown electrical network having two current terminals $1a$, $1b$, and two voltage terminals $1c$ and $1d$.

Alternating current is supplied to terminals $1a$ and $1b$ of element 1 through a circuit including an adustable resistor 2, a potentiometer resistance 3, a switch 4 and an ammeter 5, all connected in series with any suitable source 6 of alternating electromotive force. An amplifying tube 7 is provided for amplifying the alternating potential appearing across terminals $1c$ and $1d$ of element 1 due to passage of current between terminals $1a$ and $1b$. For this purpose the cathode of tube 7 is connected by a conductor 8 with terminal $1c$ and the control grid of the tube is connected through a sliding contact 9 and a portion of a potentiometer resistance 10 with a conductor 11 connected with terminal $1d$ of element 1; potentiometer resistance 10 being connected between conductors 8 and 11 to give a suitable bias to the control grid of tube 7 and being preferably of such magnitude as to pass a negligible amount of current.

A rectifier or converter, indicated symbolically at 12, is coupled to the output circuit of amplifier 7 by means of a transformer 13. Element 12 may be any suitable device, as for example a bridge type metal oxide rectifier, for converting alternating potentials to direct potentials. The direct current terminals of converter 12 are connected by conductors 14 and 15 to opposite terminals of a four arm network comprising three equal resistors 16, 17 and 18 and a direct current galvanometer 19 having an internal resistance equal to that of each of the resistors 16, 17 and 18. The direct current terminals of a second converter 20 are connected across the other pair of opposing terminals of the galvanometer network by conductors 21 and 22. Conductors 14 and 21 leading from the high potential terminals of converters 12 and 20 respectively are connected to the network at opposite sides of the galvanometer 19, so that if the output voltages of the converters are equal, no current flows through the galvanometer.

The input terminals of converter 20 are connected to the movable arms of a double pole double throw switch 23 through a circuit similar to that described in connection with converter 12 and comprising a high resistance potentiometer 24, an amplifier 25 having its grid and cathode connected across a controllable portion of a potentiometer 24 and its output circuit coupled through a transformer 26 with the converter 20. One pair of fixed contacts of switch 23 are connected to conductors 8 and 11 and the other pair of fixed contacts of the switch are connected across a controllable portion of potentiometer 3 by conductors 27 and 28. It will be understood that the magnitude of potentiometer resistance 3 between the movable tap connected to conductor 28 and the end connected to conductor 27 should be known for each position of the movable tap, and that sufficiently numerous contacts for the movable tap should be provided along the resistance to permit of fine adjustment of the potential across conductors 27 and 28 for any fixed current through the series circuit including the potentiometer 3.

When the switch 23 is thrown to the right, the alternating potential across terminals 1c and 1d of element 1 is amplified and rectified by the two similar circuits and if the constants of the circuits are identical no current will will flow through the galvanometer as equal and opposite direct potentials are impressed thereacross. When the switch is thrown to the left, the known alternating potential across the portion of potentiometer 3 connected to switch 23 is amplified and rectified by the circuit including converter 20 and that across terminals 1c and 1d of element 1 is amplified and rectified by the similar circuit including converter 12.

In operation switch 23 is first thrown to the right to connect potentiometer 24 to terminals 1c and 1d. If a deflection of the galvanometer needle then occurs, one or the other of the sliding contacts on potentiometers 10 and 24 is adjusted until no current flows through the galvanometer 19, indicating complete equivalence of the parallel amplifying and rectifying circuits. Switch 23 is then thrown to the left to connect potentiometer 23 across the conductors 27 and 28. The position of the sliding contact along potentiometer 3 is then adjusted until the current through galvanometer 19 is returned to zero. When this condition is reached, the absolute magnitude of the alterating voltage across terminals 1c and 1d of element 1 must be equal to that across conductors 27 and 28 as the equivalence of the parallel amplifying and rectifying circuits has been insured by the preliminary adjustment while switch 23 was thrown to the right to impress the same voltage on each circuit.

As the resistance of potentiometer 3 is known, the voltage across conductors 27 and 28 can be readily determined by reference to the position of the sliding tap and to the current in the series circuit as indicated by ammeter 5. If a constant current is sent through the series circuit including potentiometer 3 and element 1, and the potentiometer calibrated in terms of potential differences, the above described apparatus and method yields a direct indication of the alternating potential across terminals 1c and 1d of element 1, the unknown potential being thus readable directly from the position of the tap along resistor 3. When element 1 is a simple impedance element, involving no magnetic coupling, and conductors 8 and 11 are connected to opposite ends thereof, as when terminals 1a and 1c are directly connected and terminals 1b and 1d are directly connected, the impedance, when the described balancing of the rectifier output has been effected with switch 23 in each position, will be exactly equal to that part of resistance 3 between conductors 27 and 28.

The apparatus of Fig. 1 may be made extremely sensitive. The use of amplifying devices in the converter input circuits is not essential but is preferred because during measurement substantially no power need be withdrawn from the source of alternating potential being measured and because relatively small alternating potentials can be made to cause considerable deflection of the galvanometer.

Figure 2:
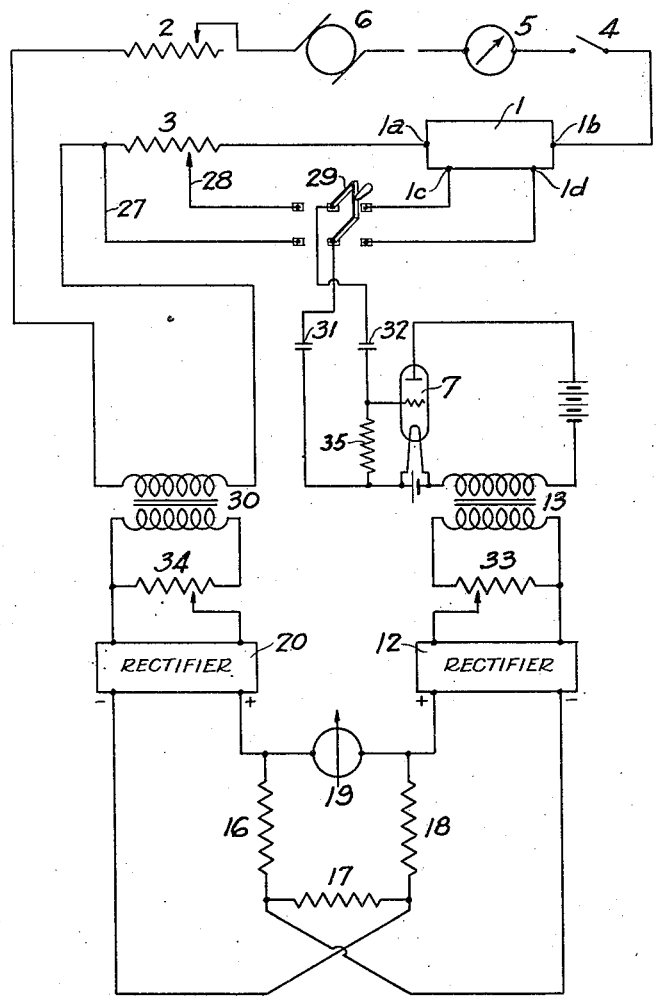
Fig. 2 illustrates diagrammatically a modified form of apparatus for practicing the method.

Fig. 2 illustrates an apparatus similar in principle to that of Fig. 1 but including an amplifier in but one of the converter input circuits. The arrangement of Fig. 2, while possibly not giving measurements of as high a degree of accuracy as those given by the circuits of Fig. 1, can be constructed more economically and can be made sufficiently sensitive and accurate for most purposes.

The arrangement of Fig. 2 differs from that of Fig. 1 primarily in that the input circuit of converter 12 includes a double pole double throw switch 29 for impressing upon the converter a voltage varying either with that across terminals 1c and 1d of element 1 or with that across a controllable portion of potentiometer 3; whereas the input circuit of converter 20 is permanently coupled to the exciter circuit by means of an iron-cored transformer 30. Amplifier 7 has its cathode and control grid connected through capacities 31 and 32 respectively to the movable contact arms of switch 29. A resistance 35, sufficiently large to draw but a negligible current is connected between the cathode and grid of amplifier 7 to provide the proper grid bias for the tube.

A potentiometer 33 having the variable portion thereof connected to the input terminals of converter 12 is coupled to the output circuit of amplifier 7 by transformer 13.

Transformer 30 has its primary winding connected in series with element 1 and potentiometer 3 in the exciter circuit. A potentiometer 34 having the variable portion thereof connected to the input terminals of converter 20 is connected in series with the secondary winding of transformer 30.

In operation of the apparatus of Fig. 2, switch 29 is first thrown to the right to connect terminals 1c and 1d across the input of the amplifier. The movable taps along potentiometers 33 and 34 are then adjusted until the converter output voltages are equal, as indicated by no current through the galvanometer 19. When the circuits are in balance, switch 29 is thrown to the left and the tap along potentiometer 3 adjusted until the converter output voltages are again brought to equality, care being taken, of course, not to disturb the adjustments of the taps along potentiometers 33 and 34. If the exciter current has not changed during the above described balancing of the circuits, the alternating potential across terminals 1c and 1d of element 1 must be equal to that across the portion of potentiometer 3 impressed upon the measuring circuit because the described procedure has made each of said alternating potentials when amplified and rectified by the identical circuit equal to the same potential, namely that appearing at the output of converter 20. Similarly, if element 1 is an impedance and terminals 1c and 1d coincide with terminals 1a and 1b respectively, the resistance across that portion of potentiometer 3 connected to switch 29 must be a numerical measure of the ohmic impedance of element 1, when the circuits have been properly adjusted and balanced.

The preferred form of apparatus embodying the invention and one modification thereof have now been described and the new method has been indicated broadly and in connection with the apparatus. Commercial applications of the apparatus and of the method are numerous and will readily occur to one skilled in the art of electrical measurements. Accurate measurements of either impedance or of alternating potentials are required in magnetic analysis, in geophysics, and in numerous other arts.

Figure 1A:
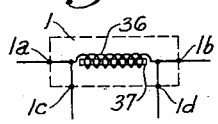
Fig. 1a illustrates an example of an element of which the impedance may be measured by the apparatus of Figs. 1 or 2.
Figure 1B:
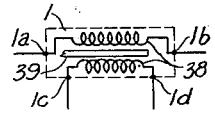
Fig. 1b and 1c illustrate examples of elements in which the alternating potentials induced therein may be measured by the apparatus of Figs. 1 or 2.
Figure 1C:
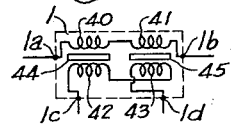

Specific examples of the use of the apparatus of Figs. 1 and 2 will now be considered in connection with Figs. 1a, 1b and 1c.

In a copending application, Serial No. 604,725, filed April 12, 1932, is disclosed a method of testing rails or the like by passing direct current through the rail and noting the effect of the magnetic field upon the impedance of a coil carrying alternating current and having a core whose permeability varies with the strength of magnetic field, the distribution of the field about the rail varying according to the physical and chemical characteristics of the rail. Thus if element 1 of either Figs. 1 or 2 comprises, as shown in Fig. 1a, a coil 36 connected at one end to terminals 1a and 1c and at the other end to terminals 1b and 1d, and having a suitable core 37 therein whose permeability varies with the strength of magnetic field in which it is located, then the apparatus and method of the present invention could be advantageously employed in connection with the disclosure of said copending application as measurements of the impedance of coil 36 could be made with core 37 subjected to the field about different points of the rail or other conductor being tested, a change in the impedance of coil 36 as the core and coil move longitudinally along the rail to explore different portions of the field, indicating a change in the physical or chemical characteristics of the rail.

Coil 36 and core 37 when included in the circuit of either Fig. 1 or Fig. 2 could be used to measure or compare magnetic fields for purposes other than that of magnetic analysis. For example comparisons of the measurements of the impedance of coil 36 with different orientations of the coil and core or with different location thereof with respect to the earth give accurate comparison of components of the magnetic field of the earth. Also the arrangement could be used to indicate the presence of magnetic material in the neighborhood of the core.

If the transformer 38 of Fig. 1b having its primary winding connected between terminals 1a and 1b and its secondary winding connected between terminals 1c and 1d were inserted in the arrangements of either Figs. 1 or 2, the structure of wires, rods, bars or the like of ferro-magnetic material could be investigated for uniformity, the material to be investigated forming a core 39 and successive measurements of the alternating voltage across the secondary being taken as the core 39 is moved longitudinally through the transformer so as to have different portions subjected to the alternating flux set up by the current through the primary.

Instead of investigating a ferro-magnetic rod or bar by comparing one portion thereof with another portion, as in the case just discussed, one specimen may be compared with another by substituting in the circuits of either Fig. 1 or Fig. 2 the element illustrated in Fig. 1c which comprises two like primary coils 40 and 41 connected in series between terminals 1a and 1b and two oppositely wound like secondary coils 42 and 43 connected in series across terminals 1c and 1d. With a standard 44 of known physical and chemical characteristics inserted within the windings 40 and 42 and the specimen 45 to be tested inserted within the windings 41 and 43, the alternating voltage across terminals 1c and 1d is a function of the difference in the structures of the specimens, any voltage appearing across the terminals 1c and 1d indicating that the specimens are not alike.

The utility of the method and apparatus herein disclosed will be readily appreciated from the above reference to but a few of the possible commercial applications of the invention in the art of magnetic analysis. Many other applications of the invention in this and other arts could be enumerated but inasmuch as the present invention is concerned only with the measurement of impedance or of alternating potential irrespective of the particular purpose for which such measurements are made, further discussion of possible uses of the apparatus and method would be superfluous.

Although the alternating potentials to be compared have been derived from a single exciter circuit in each of Figs. 1 and 2, obviously separate exciter circuits supplied with current from sources having the same or different frequency could be used if desired. Similarly, although the particular arrangement of converter output circuit illustrated is preferred because, even when the converter outputs are unequal the output of one converter does not react upon the other converter, nevertheless various other arrangements could be used for indicating when the circuits are in balance. Amplification of one or both of the alternating voltages impressed upon the converters, while preferred for greater sensitivity, is not essential, and, when provided, may comprise one stage as specifically illustrated, or may comprise more than one stage. If the amplitude of a single harmonic of an unknown potential is to be measured, it is only necessary to add suitable electrical filters in the rectifier input circuits. As such filters are well known and no particular skill would be required in their selection or in their insertion into the disclosed systems, and as such inclusion into the circuits in no way alters the described method, illustration of such application of the invention is not deemed necessary.

Obviously various other changes could be made in and refinements added to or omitted from the described circuit arrangements without departing from the spirit of the invention.

The following is claimed:

1. The method of measuring the amplitude of an alternating potential which comprises rectifying two alternating potentials of which at least one is derived from that to be measured, adjusting the constants of the rectifying circuits until the rectified potentials are equal and then substituting for one of the alternating potentials a known alternating potential and without disturbing the constants of the rectifying circuits varying the known potential until the magnitudes of the rectified voltages are returned to equality whereby the amplitude of the unknown alternating potential is equal to the so adjusted known alternating potential.

2. The method according to claim 1 wherein each of said initially rectified alternating potentials is derived from that to be measured.

3. The method according to claim 1 wherein said known alternating voltage and that to be measured correspond to potential differences across a known adjustable resistance and an unknown impedance respectively through which equal alternating current flows, whereby the claimed adjustment of the constants of the rectifying circuits followed by adjustment of the known alternating potential adjusts the value of the known resistance until it is an ohmic measure of the unknown impedance.

4. The method of measuring the amplitude of an alternating potential which comprises deriving two alternating potentials from said alternating potential to be measured, amplifying and rectifying each of said derived potentials, adjusting the constants of the amplifying and rectifying circuits to bring the rectified potentials into equality and then substituting for one of said derived potentials a known alternating potential and adjusting the same until the rectified potentials are returned to equality.

5. Electrical apparatus for measuring alternating potentials comprising in combination a pair of converters, an input circuit for each of said converters, at least one of said input circuits including adjustable elements, means for impressing alternating potentials of which at least one is that to be measured upon the input circuits of said converters, an adjustable source of known alternating potential and means connected to one of said input circuits for impressing thereupon the alternating potential of said adjustable source in place of one of said first mentioned alternating potentials.

6. Electrical measuring apparatus comprising in combination an element having a pair of current terminals and a pair of potential terminals, a series exciter circuit connected to said current terminals and including a source of alternating voltage and a potentiometer resistance, a rectifier and an input circuit therefor connected to said potential terminals, a second rectifier and an input circuit therefor and means for connecting said last mentioned input circuit either to said potential terminals or to an adjustable portion of said potentiometer, at least one of the input circuits for said rectifiers including adjustable elements whereby if the input circuits are adjusted until the rectifier outputs are equal when the potential across said potential terminals of said element is impressed upon both input circuits, then the potential across said potential terminals will be equal to that across so much of said potentiometer resistance as is required to maintain the rectifier outputs equal when said means connects that portion of said resistance with the input circuit of said last mentioned rectifier.

7. Electrical apparatus for measuring alternating potentials comprising in combination a pair of converters, an input circuit for each converter including adjustable elements and an amplifier, an adjustable source of known alternating potential, means for impressing the alternating potential to be measured upon one of said input circuits and means for optionally impressing the potential of said known source or of that to be measured upon the other of said input circuits whereby when the circuits are adjusted for equal rectifier output when the alternating potential to be measured is impressed upon both input circuits then the unknown potential is equal to that value of said known source which, when impressed upon an input circuit, maintains the rectifier outputs equal.

8. Electrical measuring apparatus comprising in combination an element having a pair of current terminals and a pair of potential terminals, a series exciter circuit connected to said current terminals and including a source of alternating voltage, a potentiometer resistance and the primary winding of a transformer, a rectifier having an input circuit, a switch adapted in one position to connect said input circuit across the potential terminals of said element and in the other position to connect said input circuit across an adjustable portion of said potentiometer, a second rectifier, an input circuit for said second rectifier connected to the secondary of said transformer, at least one of said input circuits including adjustable elements whereby the outputs of said rectifiers may be made equal when said switch is in a position to impress the alternating potential of said potential terminals across the input circuit of said first mentioned rectifier.

9. In a system for measuring the amplitude of alternating potentials, the combination comprising a source of alternating potential to be measured, a known adjustable source of alternating potential, and a source of constant alternating potential, a rectifier having an input circuit including an amplifier, means for optionally connecting said input circuit with either said source to be measured or said adjustable known source, a second rectifier having an input circuit connected with said constant source and means so connected to the output terminals of said rectifiers as to indicate the differential of the rectified potentials, at least one of said input circuits including adjustable elements whereby they may be adjusted until the rectifier outputs are equal when the alternating potential to be measured is impressed upon the first mentioned input circuits.

10. In combination with an apparatus for measuring the ohmic resistance of a coil comprising in combination a series exciter circuit for the coil including a source of alternating voltage and a potentiometer resistance, two rectifiers each having an input circuit, means for deriving two alternating potentials from said exciter circuit, means for permanently impressing one of said derived potentials upon one of said input circuits, means for optionally impressing either the other of said derived potentials or the potential across a controlled portion of said potentiometer upon the other of said input circuits, at least one of said derived potentials corresponding to that across said coil, and means in at least one of said input circuits for adjusting the same to equalize the output potentials of said rectifiers.

In testimony whereof I have signed my name to this specification.

THEODOR ZUSCHLAG.